(12) United States Patent
Taki et al.

(10) Patent No.: US 7,036,989 B2
(45) Date of Patent: May 2, 2006

(54) ROLLER BEARING OIL FEED DEVICE

(75) Inventors: Masafumi Taki, Kawasaki (JP); Takashi Ito, Ichikawa (JP); Takashi Tsujimoto, Iwata (JP)

(73) Assignees: Isuzu Motors Limited, Tokyo (JP); NTN Corporation, Osaka (JP)

( * ) Notice: Subject to any disclaimer, the term of this patent is extended or adjusted under 35 U.S.C. 154(b) by 131 days.

(21) Appl. No.: 10/397,510

(22) Filed: Mar. 26, 2003

(65) Prior Publication Data

US 2003/0185477 A1    Oct. 2, 2003

(30) Foreign Application Priority Data

Mar. 29, 2002    (JP) .............................. 2002-096210

(51) Int. Cl.
*F16C 19/00* (2006.01)
*F16C 19/40* (2006.01)

(52) U.S. Cl. ................. 384/475; 384/462; 384/551

(58) Field of Classification Search ............... 384/470, 384/484, 475, 474, 558, 551, 572, 462
See application file for complete search history.

(56) References Cited

U.S. PATENT DOCUMENTS

| | | | |
|---|---|---|---|
| 1,913,769 A | | 6/1933 | Moreland |
| 3,885,842 A | * | 5/1975 | Furutsu ..................... 384/468 |
| 4,408,808 A | | 10/1983 | Redmann, Jr. et al. ..... 308/187 |
| 4,787,757 A | | 11/1988 | Finger ........................ 384/470 |
| 5,253,733 A | * | 10/1993 | Miyachi ................... 184/6.26 |
| 5,320,433 A | * | 6/1994 | Kimata et al. .............. 384/473 |
| 5,362,159 A | * | 11/1994 | Kufner et al. .............. 384/484 |
| 5,683,224 A | | 11/1997 | Sebald et al. ............... 415/111 |
| 5,803,616 A | * | 9/1998 | Persson et al. ............. 384/473 |
| 5,853,227 A | | 12/1998 | Schmidt, III ................ 301/5.7 |
| 6,152,606 A | * | 11/2000 | Shirosaki et al. ........... 384/558 |
| 6,227,713 B1 | * | 5/2001 | Neder et al. ............... 384/484 |
| 6,428,212 B1 | * | 8/2002 | Tanaka ....................... 384/475 |
| 6,732,600 B1 | * | 5/2004 | Greubel ..................... 74/89.44 |

FOREIGN PATENT DOCUMENTS

| | | |
|---|---|---|
| FR | 2 450 975 | 10/1980 |
| GB | 1 254 418 A | 11/1971 |
| JP | 5-30546 | 4/1993 |
| JP | 08-232963 | 9/1996 |
| JP | 10-274243 | 10/1998 |
| JP | 11-280772 | 10/1999 |
| JP | 2000-130565 | 5/2000 |
| JP | 2000-193069 | 7/2000 |
| JP | 2000-230559 | 8/2000 |

* cited by examiner

*Primary Examiner*—Richard W. Ridley
*Assistant Examiner*—Colby Hansen
(74) *Attorney, Agent, or Firm*—McCormick, Paulding & Huber LLP

(57) ABSTRACT

A roller bearing oil feed device includes a plurality of rolling elements arranged in a plurality of rows in the axial direction between an outer ring and an inner ring, the inner ring being divided for each row of the rolling elements and a ring-shaped spacer being interposed at the position of this division, the inner rings and spacer being fitted onto a rotary shaft. A circumferential groove is provided in the inner peripheral section of the spacer and oil feed holes communicating with the circumferential groove are provided in the rotary shaft. An oil feed passage having an inlet opening into the circumferential groove and an outlet opening to a corner on at least one side in the axial direction of the spacer is provided in the spacer.

12 Claims, 5 Drawing Sheets

CROSS-SECTION 2C-2C

SHOWN IN
THE DIRECTION
OF THE ARROW B

ROLLER BEARING OIL FEED DEVICE

BACKGROUND OF THE INVENTION

1. Field of the Invention

The present invention relates to a roller bearing oil feed device and in particular relates to a roller bearing oil feed device that is suitable for use with a splitter section of a manual transmission for a vehicle.

2. Description of the Background

FIG. 5 shows a splitter section (primary gear-change section) that is positioned most on the input side of a manual transmission for a vehicle. This transmission comprises an input shaft 1 whereby engine drive is transmitted and a main shaft 3 within the input shaft 1 whereby one end thereof is freely relatively rotatably and coaxially supported by means of needle bearings 2. The input shaft 1 is freely rotatably supported in a transmission case 4 by means of bearings 5. A counter shaft 6 is arranged in parallel with the input shaft 1 and main shaft 3 below the input shaft 1 and main shaft 3. The counter shaft 6 is also freely rotatably supported by means of bearings 7 on the transmission case 4.

An input gear 8 is freely rotatably supported on the outer peripheral side of the input shaft 1 by means of needle bearings 8a. A splitter gear 10 constituting a first main gear is freely rotatably supported by means of the roller bearing 9 on the outer peripheral side positioned most on the input side (left-hand side in the Figure) in the axial direction of the main shaft 3. An input counter gear 18 and splitter counter gear 19 that are normally in mesh are respectively fixed to the input gear 8 and splitter gear 10 on the counter shaft 6.

A splitter transmission mechanism 11 is provided between the input gear 8 and the splitter gear 10. The splitter transmission mechanism 11 comprises a hub 12 provided on the input shaft 1, a sleeve 13 that is normally in mesh and freely slidable in the axial direction at the outer peripheral section of the hub 12, dog gears 14 and 15 that are respectively fixed to the input gear 8 and splitter gear 10 and synchro cones 16 and 17 that are provided between the hub 12 and the dog gears 14 and 15. Splines are provided in the inner peripheral section of the sleeve 13 and the outer peripheral section of the hub 12, synchro cones 16 and 17 and dog gears 14 and 15 such that the sleeve 13 and hub 12 and the synchro cones 16 and 17 and dog gears 14 and 15 can be meshed. An identical first gear change mechanism 20 (only part shown in the Figure) is also provided behind the splitter gear 10 (right-hand side in the Figure).

When the sleeve 13 is in the position shown in the Figure, the splitter is in a neutral position (N); when the sleeve 13 moves forwardly (left-hand side in the Figure) from this position, the sleeve 13 meshes with the synchro cone 16 and the dog gear 14 with the result that the splitter assumes the "high position" (H). Contrariwise, when the sleeve 13 moves backwards (right-hand side in the Figure), the sleeve 13 meshes with the synchro cone 17 and the dog gear 15 with the result that the splitter assumes the "low position" (L). In this way, the splitter can be changed over between the three positions: H-N-L. During driving of the vehicle, the splitter initially splits the drive force of the input shaft 1 to H or L (selects H or L). There are a large number of main gears and counter gears behind the splitter, outside the Figure, and behind these in turn there is arranged a range gear for changing over H-L. This transmission is a multi-stage transmission with a larger number of stages than normal (for example 12 stages or 16 stages etc).

However, because the splitter gear 10 is a helical gear or the splitter gear 10 becomes the drive side or the driven side depending on the different H or L position, or because of the application of force in the thrust direction to the splitter gear when the splitter gear change mechanism 11 and the first gear change mechanism 20 perform gear change, the roller bearing 9 that supports the splitter gear 10 must be capable of supporting both radial load and thrust load.

Accordingly, as the roller bearing 9, conical roller bearings consisting of two rows of cones arranged symmetrically as shown in the Figure are employed. Specifically, the roller bearing 9 chiefly comprises an outer ring 21 that is fitted and fixed by pressing in etc into the inner peripheral section of the splitter gear 10, an inner ring 22 that is fitted and fixed by pressing in etc into the outer peripheral section of the main shaft 3 and rolling elements 23 comprising a plurality of conical rollers arranged in each case in the circumferential direction in a plurality of rows (two in this case) and in the axial direction between the outer ring 21 and inner ring 22. The inner ring 22 is equally divided in the axial direction for each row of the rolling elements 23 (in this case it is divided into two) and a ring-shaped spacer 24 is interposed between the inner rings 22, 22 at the position of this division, in the space in the axial direction. The spacer 24 is loosely fitted in the outer peripheral section of the main shaft 3. The dimensions in the axial direction of the positions of these inner rings 22, 22 and spacer 24 are specified beforehand by means of a stop member 25 and a larger diameter step 26 of the main shaft 3; the clearance in the axial direction of the inner rings 22, 22 and the spacer 24 in this position is adjusted by suitably selecting a plurality of spacers 24 having different widths in the axial direction. The outer ring 21 is restrained in the axial direction by means of a pair of stop rings 27 and each row of rolling elements 23 is held by means of a respective holder 28.

Also, an oil feed device as detailed below is provided in order to lubricate the contact interface on the inside of the roller bearing 9, in particular between one rolling element 23 and its fellow (inner ring 22 or outer ring 21). That is, on the inside of the main shaft 3, there is provided a branch hole 30 constituting an oil feed hole extending to the outside in the radial direction from the main oil hole 29 inside the main shaft 3, at the position where the main oil hole 29 is provided along the central portion thereof and of the spacer 24 in the axial direction. This spacer 24 is formed of channel-shaped cross-section open on the radially inner side facing the outlet of the branch hole 30. In other words, a circumferential groove 31 communicating with the outlet of the branch hole 30 and that extends along the entire circumference thereof is provided in the spacer 24. Also, a plurality (in this case, four) of oil feed holes 32 are provided in the circumferential direction, passing through the bottom face of the circumferential groove 31 (face positioned on the most radially outward side) and through the outer circumferential surface of the spacer 24.

Lubricating oil supplied from an oil pump, not shown, as shown by the arrows in the Figure, flows through the main oil hole 29 forwards in the axial direction of the main shaft 3, is branched to the branch hole 30, temporarily accumulated in the circumferential groove 31 of the spacer 24 and is then discharged in the radially outwards direction from the oil feed holes 32 by centrifugal force produced by the rotation, thereby lubricating the inside of the roller bearing 9.

However, with such a construction, when the sleeve 33 of the first gear-change mechanism 20 meshes with the dog gear 34 that is fixed behind the splitter gear 10, the input shaft 1 and the splitter gear 10 rotate in synchronization (i.e. they do not rotate relatively). Consequently, the outer ring 21 and inner rings 22 of the roller bearing 9 then rotate in synchronization. Consequently, in a condition in which the rolling elements 23 do not roll, the condition in which radial load and thrust load are applied to the contacting locations of the outer ring 21 and inner rings 22 and rolling elements 23 continues. Thus, in a condition in which the rolling elements 23 are not rolling, since movement of the contacting locations of the rolling elements 23 and the outer ring 21 and inner rings 22 is also not taking place, the lubricating oil at the contact interface tends to be insufficient and so-called fretting wear tends to occur.

In such a situation, with the oil feed device described above, oil discharged from the oil feed holes 32 of the spacer 24 tends to fly radially straight outwards due to the centrifugal force, slipping through between the rolling elements 23 of each row until it collides with the intermediate space in the axial direction of the inner peripheral surface of the outer ring 21 and tend to flow towards both ends in the axial direction along the inner peripheral surface of the outer ring 21. Consequently, notwithstanding that a comparatively large quantity of oil is supplied to the contacting locations of the rolling elements 23 and the outer ring 21, it is difficult to achieve a supply of oil to the contacting locations of the rolling elements 23 and the inner rings 22 and fretting wear therefore tends to be produced at these contacting locations. Also, since the oil feed holes 32 of the spacer 24 are provided with a prescribed separation in the circumferential direction, there is a possibility that, between oil feed holes 32 that are adjacent in the circumferential direction, oil will not sufficiently penetrate to the contacting locations at positions which are more remote in the axial direction; this too tends to cause fretting wear on the side of the inner rings.

SUMMARY OF THE INVENTION

The present invention was made in view of the above problems, its object being to prevent fretting wear in the locations of contact of the rolling elements and the inner ring in cases where the outer ring and the inner ring of the roller bearing rotate in synchronization.

The present invention consists in a roller bearing oil feed device wherein a plurality of rolling elements are arranged in a plurality of rows in the axial direction between an outer ring and inner ring, said inner ring being divided in the axial direction for each row of said rolling elements and a ring-shaped spacer being interposed at the position of this division, in which said inner rings and said spacer are fitted onto a rotary shaft, a circumferential groove is provided in the inner peripheral section of said spacer in the middle in the axial direction and oil feed holes communicating with said circumferential groove are provided in said rotary shaft and an oil feed passage comprising an inlet opening into said circumferential groove and an outlet opening to a corner where at least one of the outside face and outer peripheral face in the axial direction of said spacer meet is provided in said spacer.

Preferably a holder that holds a plurality of said rolling elements in each row is provided for each row and the minimum interval in the axial direction of adjacent outlets of said oil feed passages positioned on the two outer sides in the axial direction of said spacer is larger than the gap in the axial direction between said holders.

Preferably said oil feed passage includes an axial groove arranged in the radially inner end face of said spacer positioned on both outer sides in the axial direction with respect to said circumferential groove and a radial groove that communicates with said axial groove provided in the outside face of the two outer sides in the axial direction of said spacer.

Also preferably said oil feed passage is constituted as an inclined groove obtained by respectively cutting away the portion from the inside face on both outer sides in the axial direction to the corner on both outer sides in the axial direction of said spacer of said circumferential groove in linear and inclined fashion.

The present invention also consists in a transmission for a vehicle employing said roller bearing oil feed device wherein said roller bearing is arranged between a main shaft in said transmission and a main gear positioned most on the input side in the axial direction thereof, said rotary shaft is said main shaft, said outer ring is fitted in the inner peripheral section of said main gear, said inner rings and spacer are fitted in the outer peripheral section of said main shaft and said oil feed hole is provided extending in the radial direction in the interior of said main shaft.

According to the present invention, the outlet of the oil feed passage opens in a position which is immediately next to the locations of contact of the rolling elements and inner ring of each row i.e. is adjacent thereto in the axial direction, so supply of oil is effected from this position and an ample amount of oil is carried over to these locations of contact. Ample lubrication of these contact locations can thereby be achieved even when the outer ring and the inner rings are rotating in synchronization, making it possible to prevent fretting wear.

DESCRIPTION OF THE PREFERRED EMBODIMENTS

Preferred embodiments of the present invention are described below in detail with reference to the appended drawings.

Figure 1:
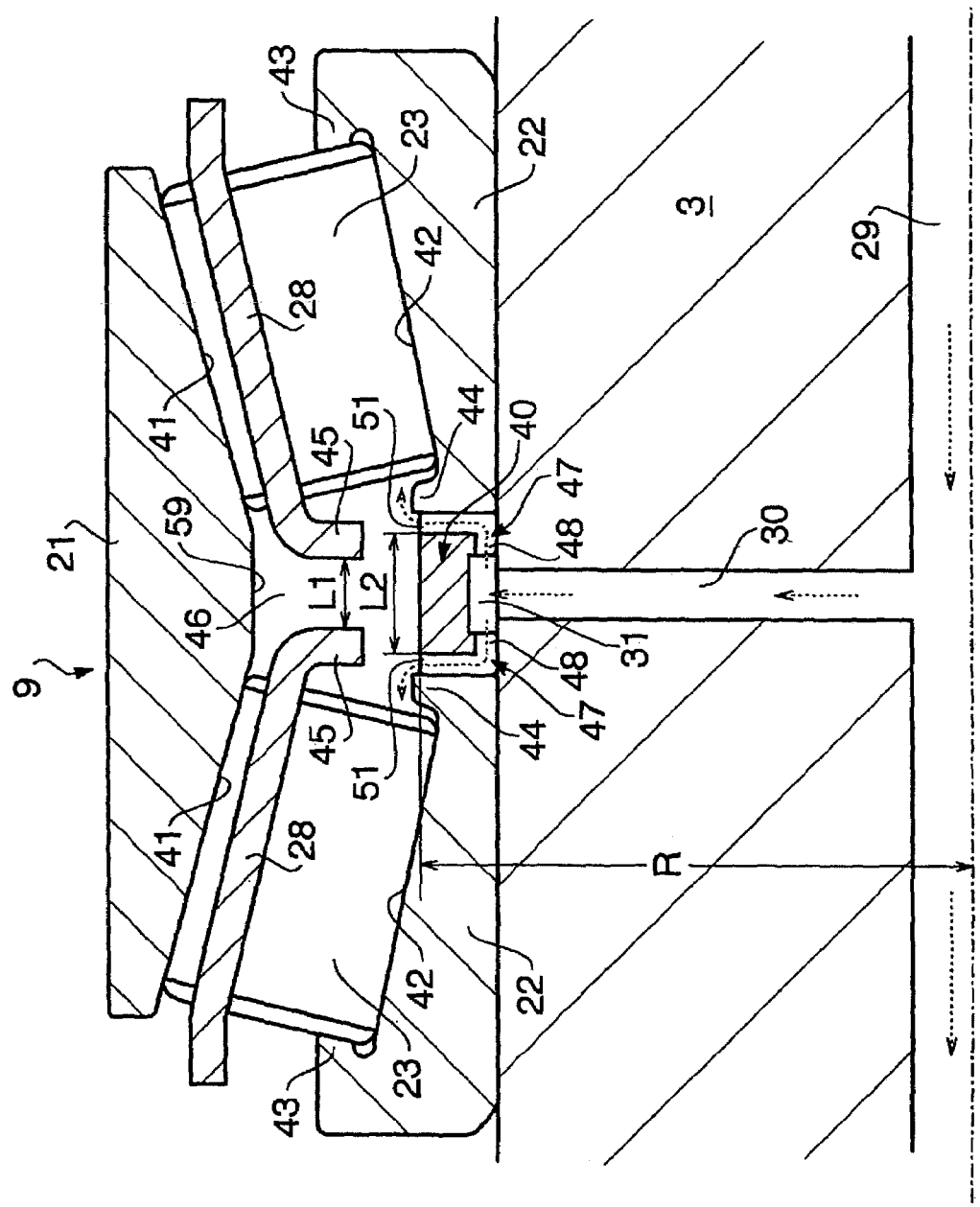
FIG. 1 is a detail cross-sectional view to a larger scale of the present embodiment.
Figure 2A:
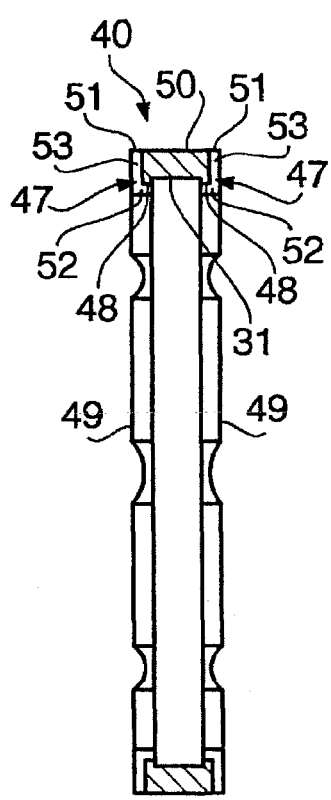
FIG. 2 shows a spacer, (a) being a front axially sectioned view, (b) being a side view, (c) being a cross-sectional view along the line 2C—2C and (d) being a view in the direction of the arrow B.
Figure 2B:
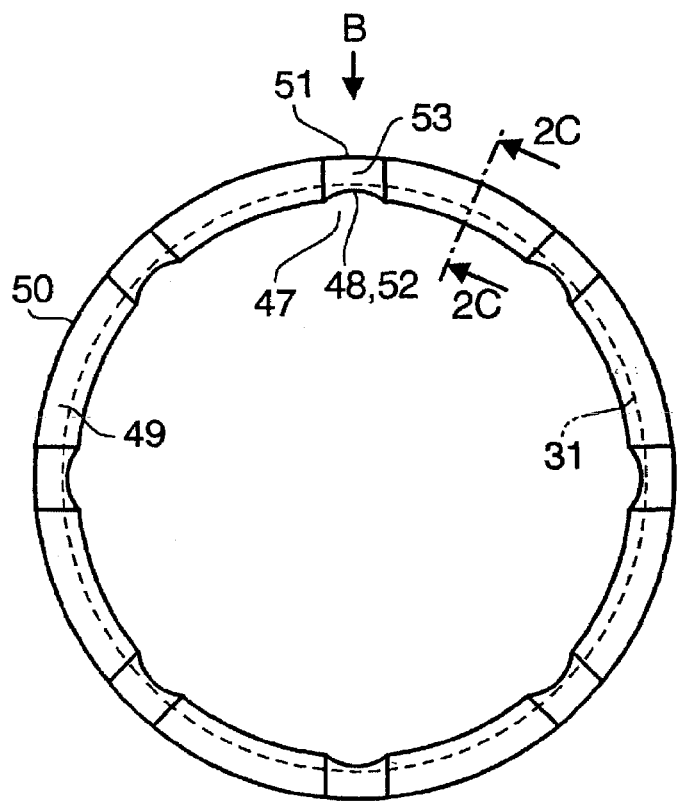
Figure 2C:
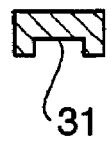
Figure 2D:
Figure 5:
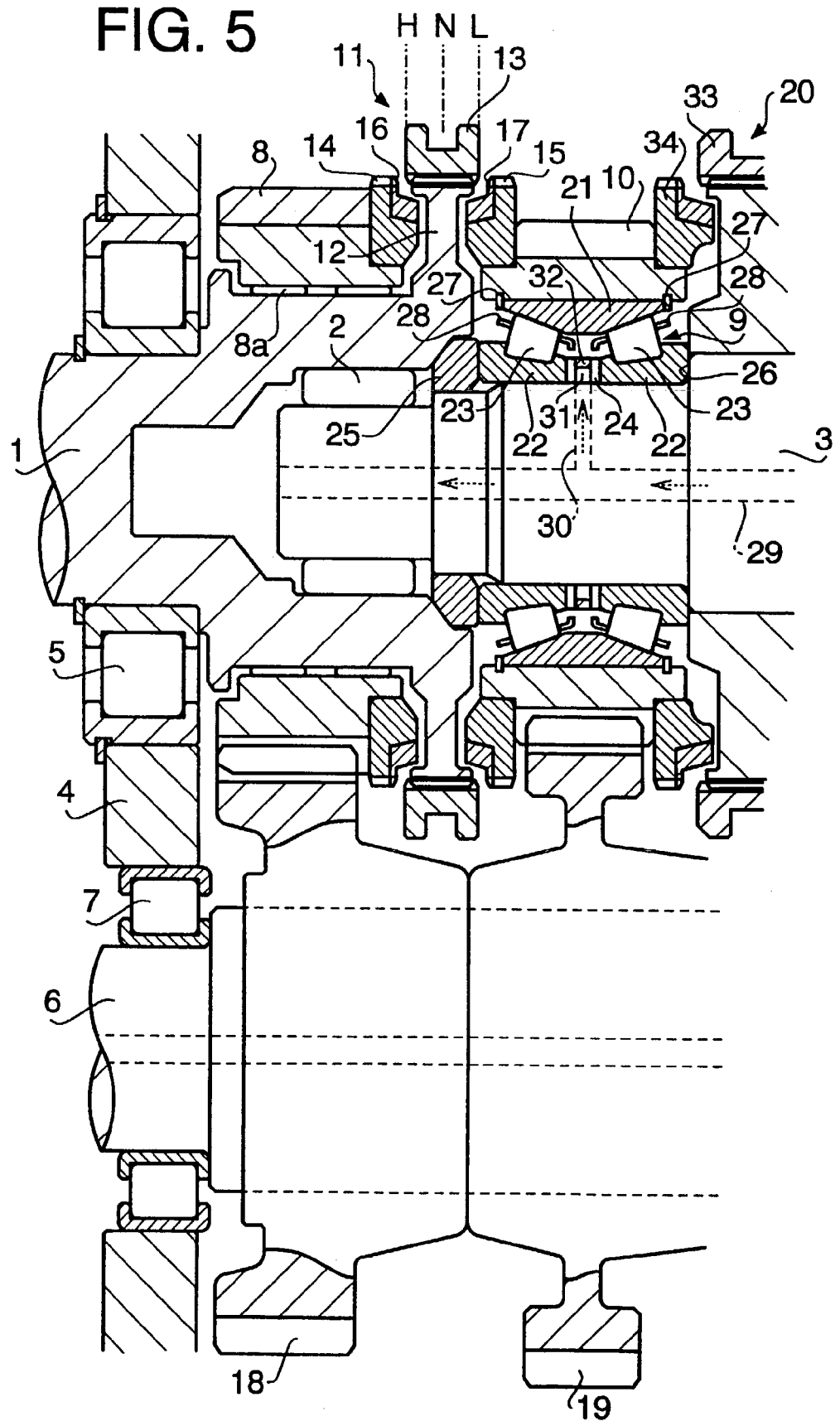
FIG. 5 is a cross-sectional view showing a splitter section of a manual transmission for a vehicle according to the present embodiment.

FIG. 1 shows a roller bearing oil feed device according to the present embodiment. This oil feed device is also applied to the splitter section of the transmission shown in FIG. 5; FIG. 1 shows the vicinity of the roller bearing to a larger scale. Structural items which are similar to those described above are given the same reference symbols and suitable supplementary description is added.

As shown in FIG. 1, the roller bearing 9 comprises an outer ring 21 as described above, two inner rings 22, 22, rolling elements 23 consisting of two rows in the axial direction, in each of which a plurality of rollers are arranged in the circumferential direction, and two holders 28. A spacer 40 is interposed between the inner rings 22, 22. This spacer 40 is different from the spacer 24 described above.

The roller bearing 9 is symmetrically constructed about a central position in the axial direction. On the inner peripheral surface of the outer ring 21, there are provided, as seen in the axial direction, two outer ring tracks 41, 41 providing contact surfaces with the rolling elements 23; in the middle, as seen in the axial direction, there is provided a cylindrical surface 59 of a comparatively short length. The outer ring tracks 41, 41 have tapered surfaces such that the outer side in the axial direction of the roller bearing 9 (end side) is of larger diameter and the inner side in the axial direction (central side) thereof is of smaller diameter. On the outer peripheral surface of the inner rings 22 there are provided inner ring tracks 42 constituting contact surfaces with the rolling elements 23; these inner ring tracks 42 constitute tapered surfaces of larger diameter on the outside in the axial direction and of smaller diameter on the inside in the axial direction. The rolling elements 23 of each row which are arranged in contact with the outer ring tracks 41 and inner ring tracks 42 have a tapered shape such that they are of larger diameter on the outside in the axial direction and of smaller diameter on the inside in the axial direction, with their central axes being tilted with a prescribed angle with respect to the central axis of the roller bearing 9, such that the outer side thereof in the axial direction is at a radial position that is larger than the inner side thereof in the axial direction. Projections 43, 44 for holding the rolling elements 23 in the axial direction are formed on the outside and inside in the axial direction of the inner ring tracks 42.

The holders 28 are overall of ring shape and are provided with a plurality of holding holes (not shown) that hold a plurality of rolling elements 23 respectively inserted therein at equal intervals in the circumferential direction. The holders 28 comprise bent sections 45 bent radially inwards at the end on the inside in the axial direction and a gap 46 is formed having an axial dimension L1 between the bent sections 45, 45 of each row thereof. A spacer 40 is arranged on the inside in the radial direction of these bent sections 45, 45 and gap 46. A main oil hole 29 and branched hole 30 as described above are provided in the main shaft 3 where the inner rings 22, 22 and spacer 40 are fitted. The spacer 40 and branched hole 30 are positioned in a central position in the axial direction of the roller bearing 9. The spacer 40 has a radius R that is substantially equal to that of the projections 44 formed at the inside ends in the axial direction of the inner rings 22.

As shown in detail in FIG. 2, the spacer 40 is, as a whole, formed in ring shape and can be made of various types of material such as metal or resin. Preferably the spacer 40 is a unitary component made of ceramics. As also shown in FIG. 2(c), the cross-section of the spacer 40 is formed in channel shape open on the radially inwards side facing the outlet of the branched hole 30. In other words, the inner circumference of the spacer 40 is provided with a circumferential groove 31 extending around the entire circumference and communicating with the outlet of the branched hole 30. The cross-sectional shape of the circumferential groove 31 is a rectangular shape. The circumferential groove 31 functions as an oil reservoir that temporarily accumulates oil flowing from the branched hole 30.

Also in the spacer 40 there are provided oil feed passages 47 for distributing and feeding the oil that has accumulated in the circumferential groove 31 to the rolling elements 23 of each row. The oil feed passages 47 are provided with inlets 48 that open into the circumferential groove 31 and outlets 51 that open at a corner section where the outside face 49 and outer circumferential face 50, on both outer sides in the axial direction of the spacer 40, meet. More specifically, oil feed passages 47 comprise grooves 52 in the axial direction provided in the radially inner end face of the spacer 40 positioned on both outer sides in the axial direction of the circumferential groove 31 and grooves 53 in the radial direction that communicate with the axial grooves 52 provided in the outside face 49, on both outer sides in the axial direction of the spacer 40, the whole forming an L shape. The end on the inside in the axial direction of the axial grooves 52 constitutes an inlet 48 and the end on the outside in the radial direction of the radial grooves 53 constitutes an outlet 51. The axial grooves 52 and radial grooves 53 are both of partially arcuate cross-sectional shape. Eight such oil feed passages 47 are provided at equal intervals in the circumferential direction of the spacer 40. The conventional oil feed holes 32 (see FIG. 5) are dispensed with.

As shown in FIG. 1, the minimum interval L2 in the axial direction between adjacent outlets 51 positioned on both outer sides in the axial direction is larger than the dimension L1 of the gap 46 between adjacent holders 28.

In this oil feed device, lubricating oil fed from an oil pump, not shown, as shown by the broken line arrows in the Figure, flows forwards in the axial direction of the main shaft 3 through the main oil hole 29 and is thence branched into the branched hole 30 and is temporarily accumulated in the circumferential groove 31 of the spacer 24, after which it is discharged to the outside in the radial direction through the oil feed passages 47 by the centrifugal force produced by the rotation. With this arrangement, in contrast to the prior art, oil from the outlets 51 which are at the corners on both outer sides in the axial direction of the spacer 40 is discharged or supplied, so supply of oil is effected from a position directly adjacent to the locations where the rolling elements 23 and the inner ring tracks 42 are in contact i.e. at a position adjacent thereto in the axial direction. Consequently, an ample amount of oil is carried over to the locations of contact between the rolling elements 23 and the inner ring tracks 42. As a result, even when the rolling elements 23 are not executing rolling because the outer ring 21 and inner rings 22 are rotating in synchronization as described above, the locations of contact between the rolling elements 23 and the inner rings 22 (locations of contact on the side of the inner rings) and the contact interface can be amply lubricated, making it possible to prevent fretting wear.

Also, in particular, since the minimum interval L2 between adjacent outlets 51 is larger than the dimension L1 of the gap 46 between adjacent holders 28, oil which flies out in the radial direction from the outlets 51 due to centrifugal force collides with the holders 28 and is then directed to the locations of contact on the side of the inner rings. Consequently, fretting wear of the locations of contact on the side of the inner rings can be positively prevented.

It should be noted that there is no risk of fretting wear at the locations of contact between the rolling elements 23 and the outer ring 21 (locations of contact on the side of the outer ring) since the oil etc that is employed for lubrication of the locations of contact on the side of the inner rings is subsequently moved in the radially outwards direction by the centrifugal force. Since the conventional oil feed holes 32 are absent, there is no flow of oil such as would directly collide with the cylindrical surface 59 by slipping through the gap 46 between adjacent holders 28 and the entire quantity of oil is thus employed for lubrication of the contact locations on the inner ring side. When the construction of this embodiment was tested in comparison with the prior art construction, it was found that its performance was enormously improved in that its life in regard to resistance to fretting was extended by a factor of about three or four compared with conventionally.

Next, another embodiment is illustrated. Parts which are the same as described above are given the same reference symbols in the drawings and detailed description thereof is dispensed with.

Figure 3:
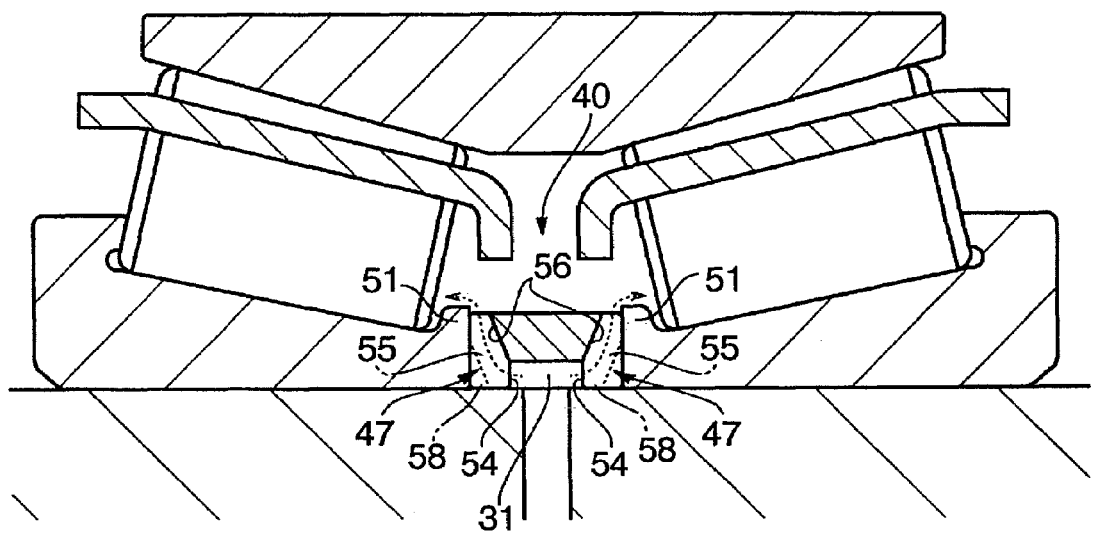
FIG. 3 is a detail cross-sectional view to a larger scale of another embodiment.

In the embodiment shown in FIG. 3, the oil feed passages 47 are constituted as inclined grooves 55 obtained by respectively cutting away the portion from the inside face 54 on both outer sides in the axial direction to the corner on both outer sides in the axial direction of the spacer 24 of the circumferential groove 31 in linear and inclined fashion. In this embodiment, the same beneficial effect as in the case of the embodiment described above is obtained and, in addition, since the bottom face 56 of the groove is inclined, the outlets 51 of the oil feed passages 47 are also directed towards the rolling elements 23 (outer side in the axial direction). Even better assurance of the quantity of lubrication of the contacting locations on the side of the inner rings can thereby be anticipated. And in yet another embodiment, as shown by the imaginary lines, the portion from the inside face 54 on both outer sides in the axial direction of the circumferential groove 31 to the corner on both outer sides in the axial direction of the spacer 24 may constitute oil feed passages 47 from inclined holes 58 respectively formed linearly and in inclined fashion.

Figure 4:
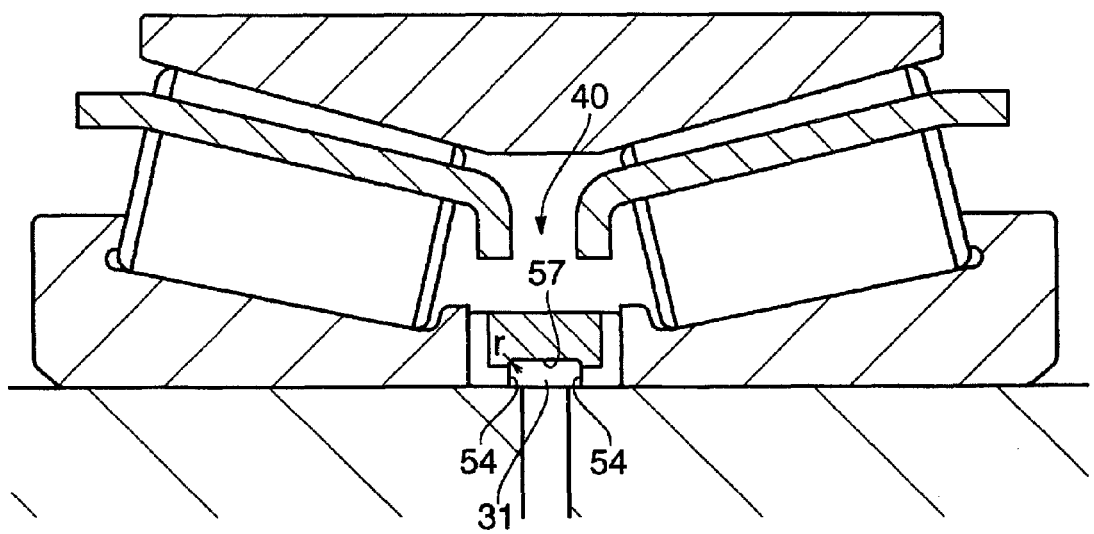
FIG. 4 is a detail cross-sectional view to a larger scale of yet a further embodiment.

The embodiment shown in FIG. 4 is basically the same as the embodiment shown in FIG. 1 but differs in that the corner where the inside surface 54 and the bottom surface 57 on both outer sides in the axial direction of the circumferential groove 31 meet is formed in a radiused shape in cross-section, having a radiusing radius r that is larger than the ordinary chamfered radiusing. In this way, the circumferential groove 31 is of U-shaped cross-section. If this is done, the loss of strength of the spacer 40 due to the provision of the axial grooves 52 and radial grooves 53 can be compensated.

Figure 6:
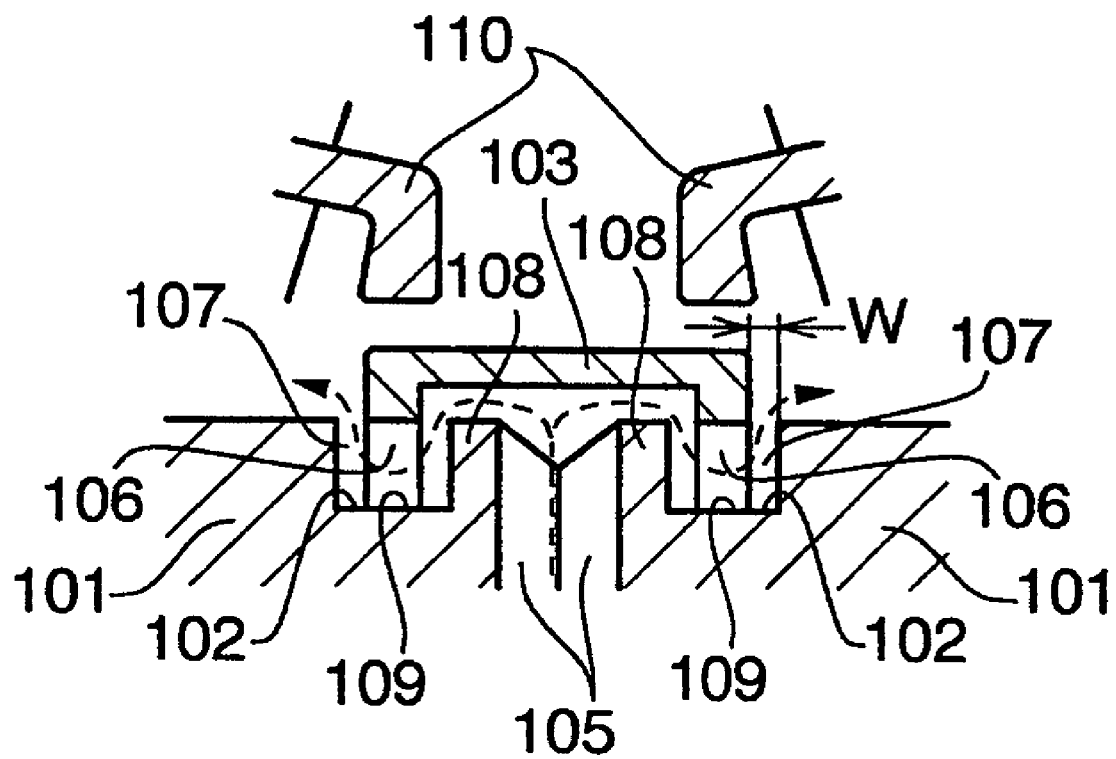
FIG. 6 is a cross-sectional view showing prior art.

It should be noted that, as shown in FIG. 6, Japanese Patent Application, Laid-open Publication No. H. 10-274243 illustrates a construction in which adjacent inner rings 101, 101 are in direct abutment and recessed grooves 102, 102 are provided in the outer circumferential surface of the inner rings 101, 101, a coupling ring 103 being fitted in and fixed so as to span the recessed grooves 102, 102 from the outer peripheral side so that the adjacent inner rings 101, 101 are coupled by the coupling ring 103. Also, a construction is indicated whereby notches 105, 105 are provided in the abutting ends of the adjacent inner rings 101, 101 and a plurality of notches 106 are also provided in the coupling ring 103, oil being supplied through the notches 105, 106 and the gap 107 of the coupling ring 103 and the side face of the recessed grooves.

However, this construction has the following drawbacks. Specifically, since the width of the recessed grooves 102 cannot be made too great because of considerations regarding strength, there is a limit to the width W of the gap 107, which gives rise to a risk that the supply of oil may be insufficient. Also, since, during assembly/disassembly, the coupling ring 103 must extend beyond the edge 108 of the inner rings 101, the internal diameter of the coupling ring 103 must be made larger than the internal diameter of the recessed grooves 102. As a result, after fitting of the coupling ring 103, the gap between the coupling ring 103 and the bottom surface 109 of the recessed groove becomes uneven in the circumferential direction, giving rise to a risk that the amount of oil supplied may become uneven in the circumferential direction. Furthermore, since the inner rings 101 are typically made of hard material, processing costs become high in a construction in which the recessed grooves 102 are processed. In addition, there are the drawbacks that the coupling ring 103 is difficult to attach, the coupling ring 103 tends to interfere with the holders 110 since it is radially on the outside of the inner rings 101, imposing considerable design limitations, and the requirement for a strong spring action of the coupling ring 103 makes it unsuitable for processing to form the notches 106 etc.

In comparison, a construction according to the present embodiment is not subject to these drawbacks. Specifically, since the spacer 40 is merely a spacer it does not need to have a strong spring action and so can be comparatively freely processed to form the grooves. Sufficient depth can thereby easily be achieved along the axial direction of the radial grooves 53, and an ample flow rate of oil thereby ensured. Also, although the spacer 40 is loose it is directly fitted onto the main shaft 3 and is restrained in the axial direction between the inner rings 22, so in the fitted condition the gap between the spacer 40 and the main shaft 3 is small, so there is little play in the radial direction of the spacer 40. Uniform passage area of the grooves 52 in the axial direction can therefore be guaranteed in the circumferential direction, enabling a uniform rate of feed of oil in the circumferential direction to be achieved. Nor need any consideration be given to interference with the holders 28. In addition, since the inner rings 22 are not subject to processing, processing costs can be kept low. Since the spacer 40 only needs to be fitted onto the main shaft 3, assembly and disassembly thereof are easy.

Various other embodiments of the present invention may be considered. Apart from the embodiments described above, various other shapes of the oil feed passages may be considered and their number may be increased or decreased at will. Combination with the embodiments described above is also possible. Depending on the construction of the roller bearing, the area, shape and number etc of the oil feed passages may be changed between one side and the other side in the axial direction. Also, apart from conical rollers as in the embodiment described above, the rolling elements of the roller bearing could be cylindrical rollers or ball bearings etc. In addition, the present invention could also be applied to other than splitter sections of manual transmissions for vehicles.

The present application claims priority of under 35 U.S.C. § 119 to Japanese Patent Application No. 2002-96210 filed Mar. 29, 2002, entitled "ROLLER BEARING OIL FEED DEVICE". The contents of that application are incorporated herein by reference in their entirety.

What is claimed is:

1. A roller bearing oil feed device comprising an outer ring, a first inner ring and a second inner ring and a plurality of rolling elements, arranged in a plurality of rows in the axial direction between said outer ring and said first and second inner rings, and a ring-shaped spacer being interposed between said first and second inner rings, the spacer having inner and outer circumferential faces and opposed outside axial faces, wherein said first and second inner rings and said spacer are configured to be fitted onto a rotary shaft, the outside axial faces of said spacer abut said first and second inner rings, respectively, a circumferential groove is provided in the inner circumferential face of said spacer and an oil feed passage comprising an inlet opening into said circumferential groove for passage of oil along inner circumferential face and at least one axial face to an outlet opening at a corner of said spacer where at least one of the outside axial faces of said spacer and the outer circumferential face of said spacer meet is provided in said spacer.

2. The roller bearing oil feed device according to claim 1, wherein a holder that holds a plurality of said rolling elements in each row is provided for each row and the minimum interval in the axial direction of adjacent outlets of said oil feed passages positioned on both outer axial faces in the axial direction of said spacer is larger than a gap in the axial direction between said holders.

3. The roller bearing oil feed device according to claim 2, wherein said oil feed passage comprises an axial groove arranged in the inner circumferential face of said spacer and extending axially from said circumferential groove in two directions and first and second radial grooves provided in the opposed outside axial faces of said spacer and which communicate with said axial groove.

4. A transmission for a vehicle employing a roller bearing oil feed device according to claim 3, wherein said roller bearing is arranged between a main shaft in said transmission and a main gear positioned most on the input side in the axial direction thereof, said rotary shaft is said main shaft, said outer ring is fitted in the inner peripheral section of said main gear, said inner rings and spacer are fitted on the outer peripheral section of said main shaft and an oil feed hole is provided extending in the radial direction in the interior of said main shaft, said oil feed hole communicating with said circumferential groove.

5. The roller bearing oil feed device according to claim 2, wherein said oil feed passage is constituted as two inclined grooves obtained by respectively cutting away a portion from the inner circumferential face, each said inclined groove extending axially from said circumferential groove to one of said outside axial faces said spacer in linear and inclined fashion.

6. A transmission for a vehicle employing a roller bearing oil feed device according to claim 5, wherein said roller bearing is arranged between a main shaft in said transmission and a main gear positioned most on the input side in the axial direction thereof, said rotary shaft is said main shaft, said outer ring is fitted in the inner peripheral section of said main gear, said inner rings and spacer are fitted on the outer peripheral section of said main shaft and an oil feed hole is provided extending in the radial direction in the interior of said main shaft, said oil feed hole communicating with said circumferential groove.

7. A transmission for a vehicle employing a roller bearing oil feed device according to claim 2, wherein said roller bearing is arranged between a main shaft in said transmission and a main gear positioned most on the input side in the axial direction thereof, said rotary shaft is said main shaft, said outer ring is fitted in the inner peripheral section of said main gear, said inner rings and spacer are fitted on the outer peripheral section of said main shaft and an oil feed hole is provided extending in the radial direction in the interior of said main shaft, said oil feed hole communicating with said circumferential groove.

8. The roller bearing oil feed device according to claim 1, wherein said oil feed passage comprises an axial groove arranged in the inner circumferential face of said spacer and extending axially from said circumferential groove in two directions and first and second radial grooves provided in the opposed outside axial faces of said spacer and which communicate with said axial groove.

9. A transmission for a vehicle employing a roller bearing oil feed device according to claim 8, wherein said roller bearing is arranged between a main shaft in said transmission and a main gear positioned most on the input side in the axial direction thereof, said rotary shaft is said main shaft, said outer ring is fitted in the inner peripheral section of said main gear, said inner rings and spacer are fitted on the outer peripheral section of said main shaft and an oil feed hole is provided extending in the radial direction in the interior of said main shaft, said oil feed hole communicating with said circumferential groove.

10. The roller bearing oil feed device according to claim 1, wherein said oil feed passage is constituted as two inclined grooves obtained by respectively cutting away a portion from the inner circumferential face, each said inclined groove extending axially from said circumferential groove to one of said outside axial faces said spacer in linear and inclined fashion.

11. A transmission for a vehicle employing a roller bearing oil feed device according to claim 10, wherein said roller bearing is arranged between a main shaft in said transmission and a main gear positioned most on the input side in the axial direction thereof, said rotary shaft is said main shaft, said outer ring is fitted in the inner peripheral section of said main gear, said inner rings and spacer are fitted on the outer peripheral section of said main shaft and an oil feed hole is provided extending in the radial direction in the interior of said main shaft, said oil feed hole communicating with said circumferential groove.

12. A transmission for a vehicle employing a roller bearing oil feed device according to claim 1, wherein said roller bearing is arranged between a main shaft in said transmission and a main gear positioned most on the input side in the axial direction thereof, said rotary shaft is said main shaft, said outer ring is fitted in the inner peripheral section of said main gear, said inner rings and spacer are fitted on the outer peripheral section of said main shaft and an oil feed hole is provided extending in the radial direction in the interior of said main shaft, said oil feed hole communicating with said circumferential groove.

* * * * *